July 26, 1932.  W. W. CRILEY  1,869,006
SOLID DIE HEADER
Filed April 11, 1930  3 Sheets-Sheet 3

INVENTOR.
William W. Criley
BY
Bay Oberlin & Bay
ATTORNEYS.

Patented July 26, 1932

1,869,006

UNITED STATES PATENT OFFICE

WILLIAM W. CRILEY, OF CLEVELAND, OHIO, ASSIGNOR TO THE AJAX MANUFACTURING COMPANY, OF CLEVELAND, OHIO, A CORPORATION OF OHIO

SOLID DIE HEADER

Application filed April 11, 1930. Serial No. 443,490.

The present application relates, as indicated, to a solid die header, comprising, essentially, stock receiving means, means for cutting a blank from said stock and for positioning the same between an anvil and a plunger, and means for die forming said blank. The primary object of the invention is to provide a device of this character in which the principal disadvantages of similar prior art devices are eliminated. Further objects of the invention will appear as the description proceeds. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 1:
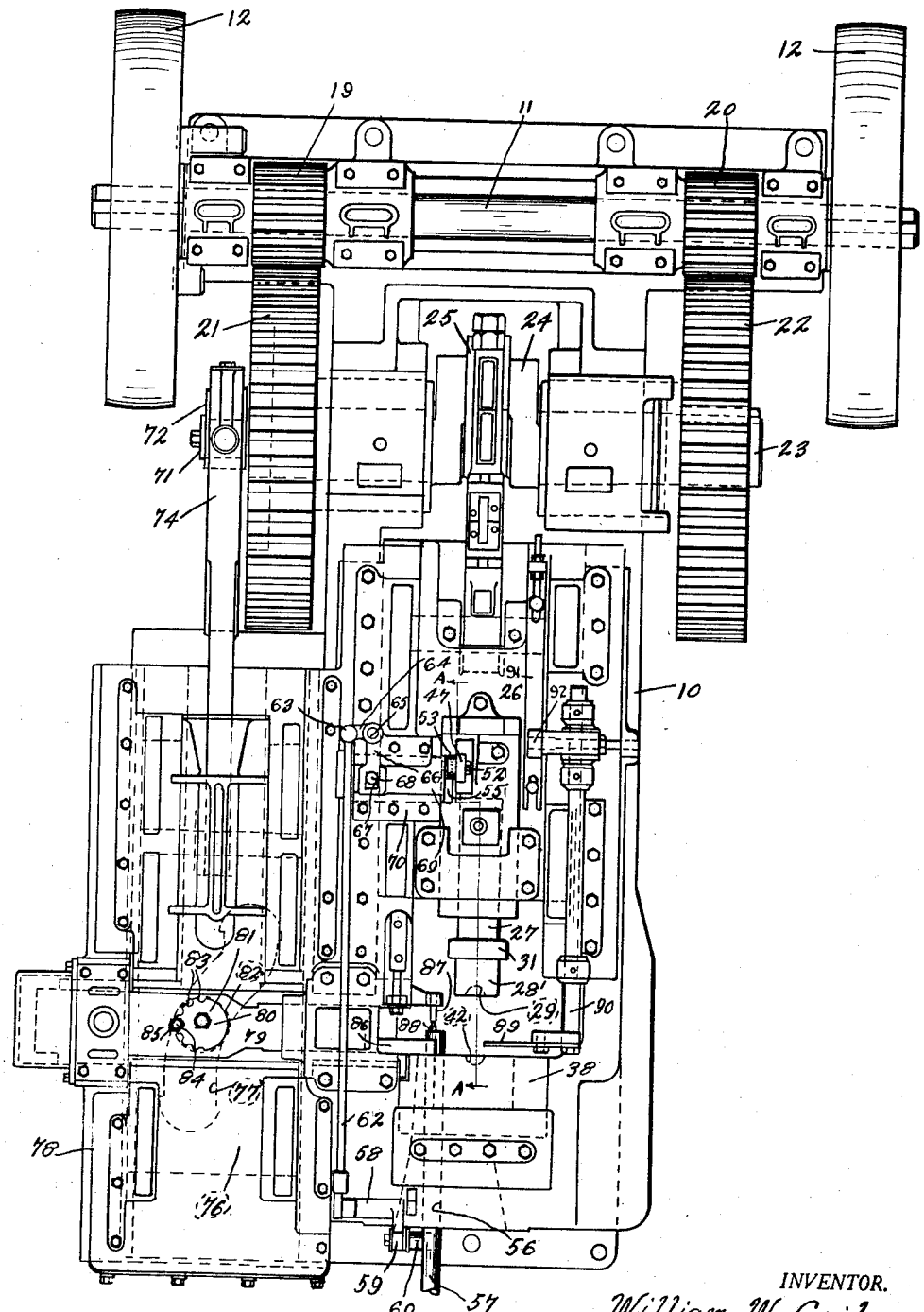
Figure 2:
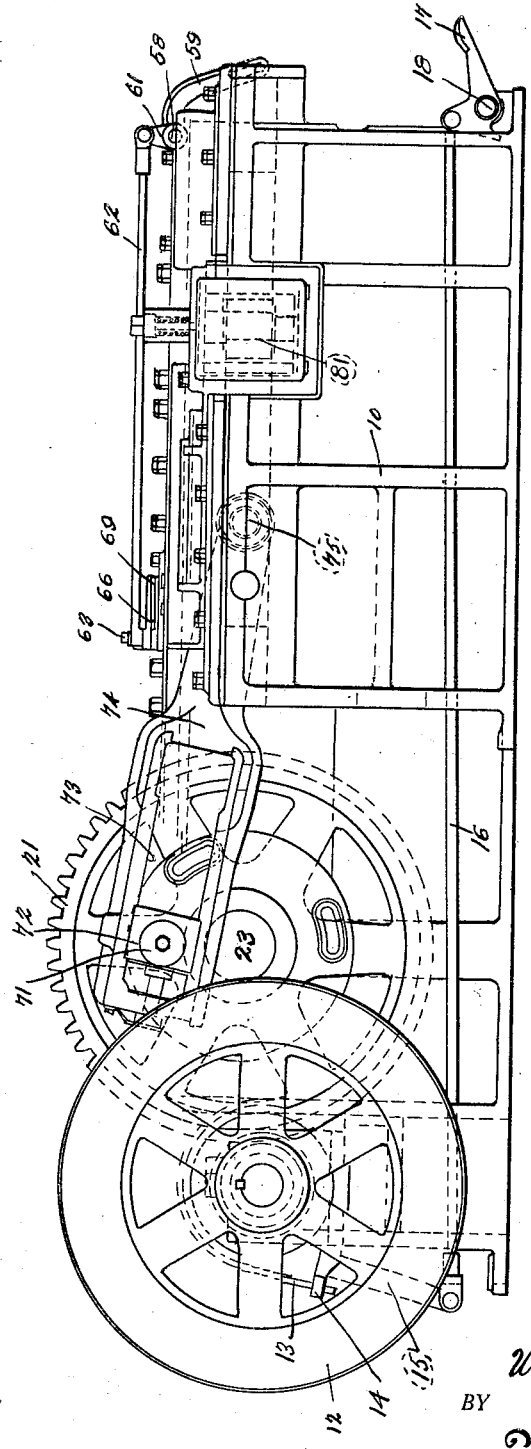

In said annexed drawings:

Fig. 1 is a plan view of a machine constructed in accordance with my invention; Fig. 2 is a side elevation thereof taken from the left of Fig. 1; and Figs. 3 and 4 are sectional views of a detail taken substantially upon the line A—A of Fig. 1.

Referring more particularly to the drawings, it will be seen that the machine comprises a frame 10 having journaled therein at one end a shaft 11 carrying pulleys or fly wheels 12 at its opposite ends. The machine may be belt driven through one or both of said pulleys 12. As is clearly shown in Fig. 2, a brake band surrounds a drum on the shaft 11 and has its one end 13 connected to an arm 14 of a lever 15 adapted to be actuated through the medium of a rod 16 connected to a bell crank lever 17 pivoted at 18 adjacent the opposite end of the machine.

The shaft 11 carries adjacent its opposite ends pinions 19 and 20 which mesh, respectively, with gears 21 and 22 carried upon a shaft 23. Said shaft 23 is formed with a crank 24 to which is connected one end 25 of a pitman having its opposite end connected to a carriage 26 slidably mounted in the frame 10.

Figure 3:
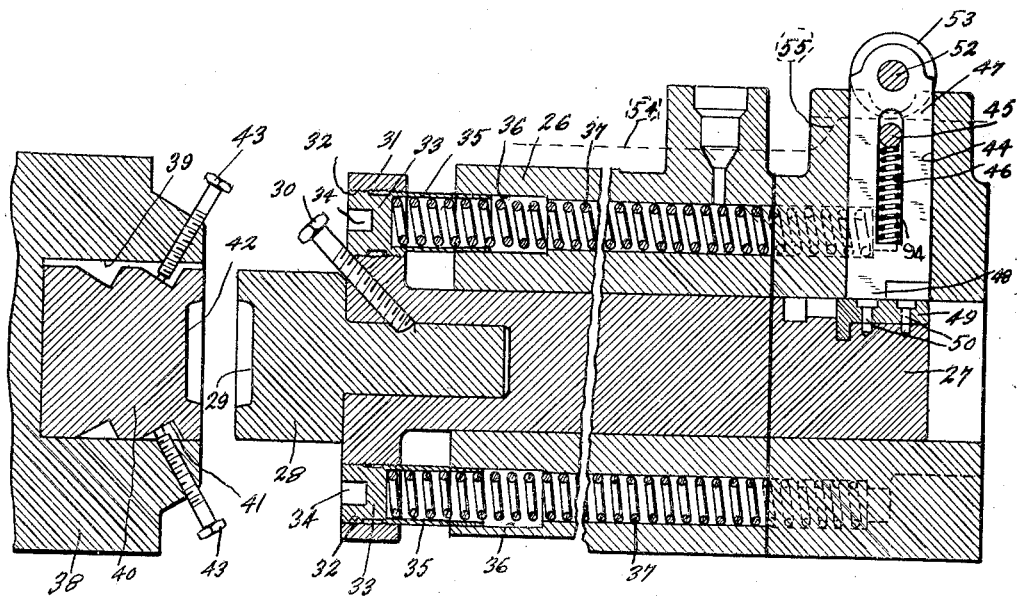
Figure 4:
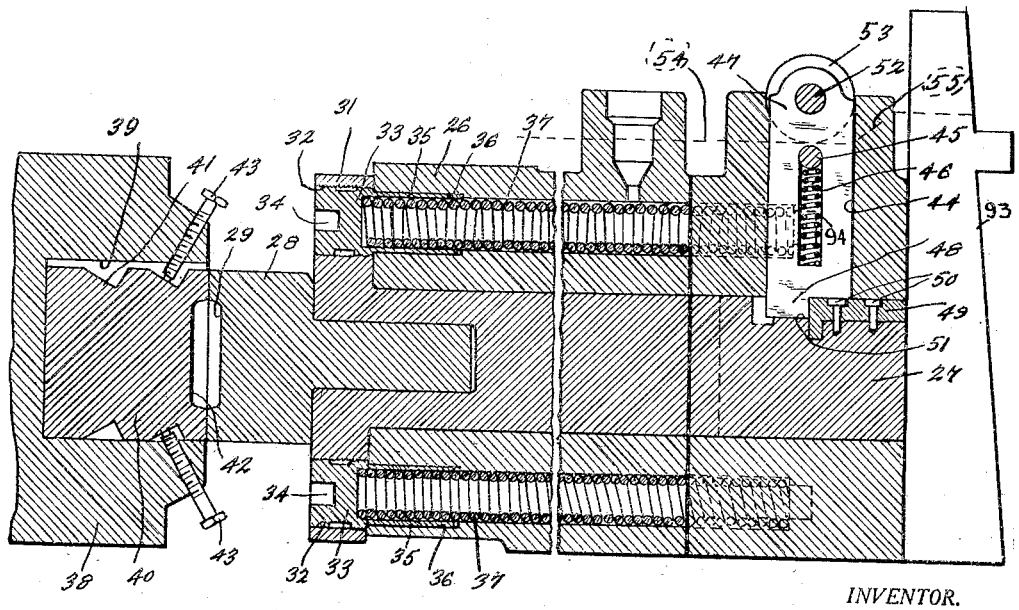

As is clearly shown in Figs. 3 and 4, the carriage 26 is formed with a longitudinal bore in which is received a plunger 27. The outer end of the plunger 27 is formed with a socket receiving a die member 28 formed with a die cavity 29, said die member 28 being secured in place by one or more set screws 30 angularly set into the plunger 27.

The plunger 27 is formed at its outer end with an annular flange 31, and said flange is provided, at two or more spaced points, with threaded apertures 32 adapted to receive plugs 33. Each of the plugs 33 is formed at its one end with a kerf 34, and at its opposite end is formed as a sleeve 35 adapted to enter and slide within a socket 36 formed at a corresponding point in the carriage 26. As is clearly shown, each of the sockets 36 encloses a compression spring 37, one end of each of said springs being received in a sleeve 35 of one of the plugs 33, and the opposite end of each of said springs abutting the bottom of one of the sockets 36. As will be obvious the springs 37 tend to prevent the plunger 27 from moving to the right as viewed in Figs. 3 and 4.

An anvil 38 is mounted upon the frame 10 in line with the carriage 26, and said anvil is formed with a socket 39 in which is received a die member 40 formed on its sides with notches 41, and at its outer end with a die cavity 42. Set screws 43 are angularly received within the anvil 38 and engage in the notches 41 of the die member 40 to retain the same in position.

The die member 28 is removable and may be changed for different styles of work. In Fig. 1 this die member is shown as slightly different from the showings of Figs. 3 and 4 and is therefore indicated as 28' in Fig. 1.

Adjacent its rear end, the carriage 26 is formed with a transverse slideway 44 having a pin 45 passed therethrough. Said pin 45 is received in a slot 46 formed in a latch member 47, said latch member being slidably received in the slideway 44. As is clearly shown, the latch member is formed with a depending tongue 48, and a coiled spring 94 is disposed in the slot 46 and bears against the pin 45 to urge the latch member 47 downwardly as viewed in Figs. 3 and 4. To the rear end of the plunger 27 there is secured a hardened latch plate 49, said plate being secured in place by means of pins 50 or other equivalent fastening means. The plate 49 forms the working wall of a notch 51 adapted to receive the tongue 48 of the latch member 47.

At its upper end, the latch member 47 carries a pin 52 upon which is mounted a roller 53 adapted to cooperate with a surface 54 formed with a cam portion 55.

Referring now, to Fig. 1, it will be seen that the frame 10 is formed with a stock-receiving opening 56 adjacent the anvil 38, and that a bar 57 of stock is adapted to be inserted therethrough. Obviously, the side of the opening 56 adjacent the anvil must be of such character as to permit shearing of the stock against said side, and if desired, such side of said opening may be formed as a notch in the anvil 38 or in the die member 40. A rock shaft 58 is mounted on the frame and an arm 59 thereon carries a roller 60 disposed adjacent the opening 56, and in such a position that, when the bar 57 is in place, said bar bears upon the roller 60 to hold the same in its lowermost position. As is perhaps best shown in Fig. 2, the rock shaft 58 carries a second arm 61 to which is pivoted one end of a rod 62, the opposite end of which is pivoted at 63 to one arm 64 of a bell crank lever pivoted at 65 to the frame. The opposite arm 66 of said bell crank lever is formed with a slot 67 receiving an upstanding pin 68 on a slide 69 mounted in a slideway formed by plates 70. The slide 69 carries the cam 55.

The gear 21 carries a pin 71 upon which is rotatably mounted a block 72, said block 72 being slidably received in a slot 73 formed in one end of a pitman 74, the opposite end of which is pivoted at 75 to a slide 76 mounted to reciprocate in a portion 78 of the frame. Said slide 76 is formed with a cam groove 77, as shown. A member 79 is mounted in the frame to reciprocate transversely thereof, and said member carries a pin 80 the mid portion 81 of which is eccentric, as shown, and carries a roller 82 which is received in the cam slot 77. The upper end of the pin 80 is formed in its periphery with a plurality of part-cylindrical notches 83 extending parallel to the axis of said pin. A bolt 84 having a head 85 is adapted to be secured in a suitable aperture in the slide 79, and to be partially received in a selected one of said notches 83. It will be obvious that the above described arrangement provides for an initial adjustment of the position of the member 79 transversely of the frame. The member 79 carries at its inner end a shear blade 86.

When the device is to be operated, the shaft 11 is driven through suitable means. Through the pinions 19 and 20, the gears 21 and 22 are rotated to rotate the shaft 23 and crank 24 thereof to cause reciprocation of the carriage 26. Presuming that a bar 57 of stock is in place in the opening 56, and has been moved up until its inner end engages the stop 87, which, as shown, is provided with a threaded socket receiving a threaded member 88 for close adjustment, the first movement of the mechanism from the position illustrated is effected through the slide 76. As the same moves to the right as viewed in Fig. 1, the cam groove 77 cooperates with the roller 82 on the pin 80 to move the shear blade 86 to the right, shearing off the portion of the bar 57 which extends beyond the opening 56 and moving the same across and into contact with the stop 89. The machine is so timed that, immediately after the blank is stopped by the stop 89, said stop which, as shown, is carried on a rock shaft 90, is moved out of the path of the carriage 26 and die member 28. This movement is effected through the medium of a cam 91 on the carriage 26 and an arm 92 on said rock shaft 90. Simultaneously, the carriage 26 moves to the right as viewed in Fig. 2 until the die member 28 carried in the plunger 27 contacts the blank, and at this time, the slide 76 begins to move toward the left as viewed in Fig. 2 to retract the shear blade 86. The blank, of course, is gripped between the plunger 27 and the anvil 38. As the carriage 26 continues to move toward the anvil 38, the springs 37 are compressed until the inner end of said plunger 27 comes into contact with the adjusting wedge 93 suitably mounted in the carriage 26. At this instant, the tongue 48 of the latch 47 drops into the notch 51, thus locking the plunger and carriage together to move thereafter as a rigid unit. Further movement of the carriage forces the plunger 27 forward and causes the blank to be pressed into shape in the die cavities 29 and 42.

Further movement of the mechanism causes the carriage to move toward the left as viewed in Fig. 2. It will be appreciated that it would be undesirable to permit the springs 37 to expand at this time, since such action would, of course, increase the period during which the hot blank would be held tightly between the die members 28 and 40, tending to heat and deteriorate the die members excessively in a relatively short time. The engagement of the latch 47 in the notch 51, however, causes the plunger 27 to move with the carriage 26 as a unit, and so to move immediately away from the anvil 38.

As the carriage 26 continues to move back, the roller 53 contacts the cam surface 55 and rides up the same, lifting the latch member 45 against the tendency of the spring 94 and removing the tongue 48 from its engagement in the notch 51. As will be obvious, the springs 37 then move the plunger 27 into the position of Fig. 3.

Machines of this type are normally so driven as to make it desirable to continue them in operation throughout the working day without stopping the operation of the machines for the introduction of new bars of stock. It will be obvious that the movements of the various elements of the machine are so timed that the die member 28 comes into contact with the blank before the shear blade 86 begins to move out of the path of said die member. If the machine is operated in the absence of blank-forming stock, unless some special provision is made, the die member 28 will pound against the shear blade 86, and the springs 37 will begin to be compressed before said shear blade is moved away. As a consequence, as the shear blade is moved out of the path of the die member 28, said die member, under the effect of the springs 37, will be forced sharply up against the die member 40. Such action would, of course, seriously damage the edge of the shear blade and would sooner or later result in damage to the two die members. Provision has consequently been made in the present machine to prevent such damaging operation.

A spring (not shown) is provided for normally holding the rod 62 as far to the left in Fig. 2 as possible, thus raising the roller 60, and moving the slide 69 to the left as viewed in Fig. 1 out of the path of the roller 53. In the ordinary operation of the machine, the bar of stock 57 will hold the roller 60 down, thus holding the slide 69 in the position of Fig. 1. When the bar has been cut to such an extent that it leaves its contact with the roller 60, the operator will hold the roller down until such time as operations on that particular bar have been completed. Of course it will be understood that the operator may, if he so desires, operate the slide 66 manually in either or both directions. If desired, the above-mentioned spring may be eliminated so that the slide 66 will stand in any position to which it is moved.

In the particular embodiment illustrated, as the press operates upon the final blank, the carriage 26, plunger 27, and latch 47 are moved into the relative positions shown in Fig. 4. The operator releases his pressure upon the lever 59, and the above mentioned spring then moves the rod 62 to slide the element 69 to the left as viewed in Fig. 1. When the carriage 26 moves to the left-hand extremity of its stroke as viewed in Fig. 2, the roller 53 does not meet with the cam surface 55, and consequently the latch 47 is not released from its engagement with the plunger 27. With the parts locked in this position, the movements of the elements of the machine are so timed that the die member 28 never contacts either the shear blade or the stop member 89.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a device of the class described, an anvil, a carriage slidable toward and away from said anvil, a solid headed plunger carried upon the forward end of said carriage and movable thereby into contact with said anvil, said plunger being slidable longitudinally of said carriage, means resiliently opposing movement of said plunger into said carriage, and latch means to hold said plunger against the tendency of said resilient means.

2. In a device of the class described, an anvil, a carriage slidable toward and away from said anvil, a plunger carried upon the forward end of said carriage and movable thereby into contact with said anvil, said plunger being slidable with respect to said carriage, a die head upon the front of said plunger, a latch to hold said plunger in its retracted position with respect to said carriage, and means for releasing the engagement of said latch with said plunger.

3. In a device of the class described, an anvil, a carriage slidable toward and away from said anvil, a solid headed plunger carried upon the forward end of said carriage and movable thereby into contact with said anvil, said plunger being slidable with respect to said carriage, a latch to hold said plunger in its retracted position with respect to said carriage, a cam surface adjacent said carriage, means on said latch adapted to engage said surface to release the engagement of said latch with said plunger, and means for moving said cam surface out of the path of said latch-carried means.

4. In a device of the class described, an anvil, a carriage slidable toward and away from said anvil, a solid headed plunger carried upon the forward end of said carriage and movable thereby into contact with said anvil, said plunger being slidable with respect to said carriage, a latch to hold said plunger in its retracted position with respect to said carriage, means for releasing the engagement of said latch with said plunger, and means for rendering said last-mentioned means ineffective.

5. A solid die header comprising a frame, an anvil on said frame, a carriage longitudinally slidable in said frame toward and away from said anvil, a plunger mounted in said carriage, a flange on said plunger, a solid die carried by the front of said plunger in advance of said flange, an adjustable abutment carried by said carriage, said plunger being slidable in said carriage to move said flange toward an end of said carriage and to bring a portion of said plunger into contact with said abutment, resilient means engaging said flange and urging the same away from said carriage end, means for causing said plunger to contact said abutment, and means to hold said plunger in contact with said abutment.

6. A solid die header comprising a frame, an anvil on said frame, a carriage longitudinally slidable in said frame toward and away from said anvil, a plunger mounted in said carriage, a flange on said plunger, a solid die carried by the front of said plunger in advance of said flange, an adjustable abutment carried by said carriage, said plunger being slidable in said carriage to move said flange toward an end of said carriage and to bring said plunger into contact with said abutment, resilient means engaging said flange and urging the same away from said carriage end, means for causing said plunger to contact said abutment, and a gravity-actuated latch for holding said plunger in contact with said abutment.

7. A solid die header comprising a frame, an anvil on said frame, a carriage longitudinally slidable in said frame toward and away from said anvil, a plunger mounted in said carriage, a flange on said plunger, a solid die carried by the front of said plunger in advance of said flange, a wedge-shaped abutment adjustably mounted in said carriage, said plunger being slidable in said carriage to move said flange toward an end of said carriage and to bring said plunger into contact with said abutment, resilient means engaging said flange and urging the same away from said carriage end, means for causing said plunger to contact said abutment, a cam on said frame adjacent the path of said carriage, a gravity-actuated latch adapted to engage said plunger to hold said plunger in contact with said abutment, and means on said latch adapted to contact said cam as said carriage moves away from said anvil, whereby said latch is lifted out of retaining engagement with said plunger.

8. A solid die header comprising a frame, an anvil on said frame, a carriage longitudinally slidable in said frame toward and away from said anvil, a plunger mounted in said carriage, a flange on said plunger, a wedge slidably mounted in said carriage, said plunger being slidable in said carriage to move said flange toward an end of said carriage and to abut against said wedge, resilient means engaging said flange and urging the same away from said carriage end, means for causing said plunger to contact said wedge, a cam on said frame adjacent the path of said carriage, a spring-pressed latch adapted to engage said plunger to hold said plunger in contact with said wedge, means on said latch adapted to contact said cam as said carriage moves away from said anvil, whereby said latch is lifted out of retaining engagement with said plunger, and means for moving said cam out of the path of said latch-carried means.

9. In a device of the class described, a frame, a carriage slidable in said frame, a plunger slidable in said carriage, resilient means for resisting movement of said plunger in one direction, means for causing movement of said plunger against the resistance of said resilient means, a latch for holding said plunger against movement under the influence of said resilient means, and means cooperable with said latch for releasing the engagement of said latch with said plunger.

10. In a device of the class described, a frame, a carriage slidable in said frame, a plunger slidable in said carriage, resilient means for resisting movement of said plunger in one direction, means for causing movement of said plunger against the resistance of said resilient means, a latch for holding said plunger against movement under the influence of said resilient means, means cooperable with said latch for releasing the engagement of said latch with said plunger, and means for rendering said last-mentioned means ineffective.

11. In a device of the class described, a frame, a carriage slidable in said frame, a plunger slidable in said carriage, resilient means for resisting movement of said plunger in one direction, means for causing movement of said plunger against the resistance of said resilient means, a latch for holding said plunger against movement under the influence of said resilient means, and means disposed in the path of said latch and co-operable therewith for releasing the engagement of said latch with said plunger.

12. In a device of the class described, a frame, a carriage slidable in said frame, a plunger slidable in said carriage, resilient means for resisting movement of said plunger in one direction, means for causing movement of said plunger against the resistance of said resilient means, a latch for holding said plunger against movement under the influence of said resilient means, means normally disposed out of the path of said latch and movable into the path thereof for releasing the engagement of said latch with said plunger, and means for moving said last-mentioned means into said path.

13. In a device of the class described, a frame, an anvil mounted on said frame, a carriage slidable in said frame toward and away from said anvil, said frame being formed to provide an opening receiving a bar of stock, a plunger resiliently slidable in said carriage, means for locking said plunger and carriage together to move as a rigid unit, means for releasing said locking means, but normally ineffective, and means for rendering said last-mentioned means effective, including an element disposed adjacent said stock-receiving opening and adapted to be engaged by said bar.

14. In a device of the class described, a frame, an anvil mounted on said frame, a carriage slidable in said frame toward and away from said anvil, said frame being formed to provide an opening receiving a bar of stock, a plunger resiliently slidable in said carriage, means for locking said plunger and carriage together to move as a rigid unit, a cam adapted to cooperate with said locking means to release the same, said cam being normally disposed out of the path of said locking means, and means for moving said cam into the path of said locking means for co-operation therewith, including an element disposed adjacent said stock-receiving opening and adapted to be operated by said bar.

15. A solid die header comprising in combination an anvil, a carriage slidable toward and away from the face of said anvil, a second carriage slidable toward and away from the side of said anvil, a shear blade on the side of said anvil, a plunger carried by said first-named carriage and movable thereby into contact with said anvil, said plunger being slidable longitudinally with respect to said first-named carriage and movable thereby into the path of said plunger, and means for preventing contact between said plunger and said second-named shear blade.

16. In a device of the class described, an anvil, a carriage slidable toward and away from said anvil, a plunger movable by said carriage into contact with said anvil, means for severing a piece of stock and holding said piece upon the anvil until said piece is engaged by said plunger, common means for driving said carriage and said severing means, and means for shortening the forward travel of said plunger upon exhaustion of stock.

17. In a device of the class described, a frame, two carriages reciprocably mounted in said frame, coacting die members on said frame and on the first-named carriage, a shear element on said die member on said frame, a cam slot in the second said carriage, a third carriage mounted upon said frame, means for reciprocating said third carriage at right angles to said first and second carriages, a shear blade carried by said third carriage and adapted to coact with said first-named shear element, said third carriage reciprocating means comprising a roller in said cam slot, said roller being revoluble upon a journal, said journal being attached to said third carriage by an eccentric mounting, and means for securing said eccentric mounting in adjusted position.

Signed by me this 9 day of April, 1930.

WILLIAM W. CRILEY.